United States Patent
Nair et al.

(10) Patent No.: US 11,907,882 B1
(45) Date of Patent: Feb. 20, 2024

(54) MODEL VALIDATION OF CREDIT RISK

(71) Applicant: Wells Fargo Bank, N.A., San Francisco, CA (US)

(72) Inventors: Vijayan Narayana Nair, Matthews, NC (US); Agus Sudjianto, Charlotte, NC (US); Weicheng Liu, Weddington, NC (US); Jie Chen, Fremont, CA (US); Kevin David Oden, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/895,140

(22) Filed: Aug. 25, 2022

Related U.S. Application Data

(63) Continuation of application No. 15/968,199, filed on May 1, 2018, now Pat. No. 11,468,383.

(51) Int. Cl.
  *G06Q 10/0635* (2023.01)
  *G06N 20/00* (2019.01)

(52) U.S. Cl.
  CPC ......... *G06Q 10/0635* (2013.01); *G06N 20/00* (2019.01)

(58) Field of Classification Search
  CPC .............................. G06Q 10/0635; G06N 20/00
  See application file for complete search history.

(56) References Cited

U.S. PATENT DOCUMENTS

| | | | |
|---|---|---|---|
| 7,805,388 B2 * | 9/2010 | Weston | G06N 20/10 706/45 |
| 10,025,813 B1 * | 7/2018 | Gebremariam | G06F 7/02 |

(Continued)

FOREIGN PATENT DOCUMENTS

| | | | |
|---|---|---|---|
| EP | 3905026 A1 * | 11/2021 | G06F 8/10 |
| EP | 3905026 A1 | 11/2021 | |

OTHER PUBLICATIONS

Data Mining: Concepts, Models, Methods, and Algorithms; Kantardzic; IEEE (Abstract) (Year: 2011).*

(Continued)

*Primary Examiner* — Brian M Epstein
*Assistant Examiner* — Francis Z. Santiago Merced
(74) *Attorney, Agent, or Firm* — K&L Gates LLP

(57) ABSTRACT

The innovation disclosed and claimed herein, in one aspect thereof, comprises systems and methods of validating models guided by machine learning algorithms. The innovation can begin by receiving a risk model for validation having multiple sets of data. A first data set is selected from as an input. Outputs are generated for validation. One output can be generating a second set of analysis results using a comparable algorithm to the risk model. Another output can be generating a second set of variables and transformations using a machine learning algorithm and an untransformed set of the selected variables to assess the set of selected transformations. Another output can be generating a third set of variables using one or more machine learning algorithms and an extended feature set of variables to assess the selected variables. The outputs are compared to the analysis results, coefficients, selected variables, and selected transformations. A report of the comparison is generated.

20 Claims, 6 Drawing Sheets

(56) References Cited

U.S. PATENT DOCUMENTS

| | | | | |
|---|---|---|---|---|
| 10,528,882 | B2* | 1/2020 | Chu | G06N 7/01 |
| 2007/0016542 | A1* | 1/2007 | Rosauer | G06Q 10/067 |
| | | | | 706/21 |
| 2012/0054642 | A1* | 3/2012 | Balsiger | G06Q 10/10 |
| | | | | 715/752 |
| 2013/0018651 | A1* | 1/2013 | Djordjevic | G06Q 10/00 |
| | | | | 704/9 |
| 2016/0148251 | A1* | 5/2016 | Thomas | G06N 20/00 |
| | | | | 705/14.43 |
| 2017/0147941 | A1* | 5/2017 | Bauer | G06N 20/10 |

OTHER PUBLICATIONS

Kantardzic, Mehmed, "Data Mining: Concepts, Models, Methods, and Algorithms", Book Abstract, IEEE, 2011, 4 pages.

* cited by examiner

MODEL VALIDATION OF CREDIT RISK

CROSS-REFERENCE TO RELATED APPLICATIONS

This application is a continuation of U.S. patent application Ser. No. 15/968,199, filed May 1, 2018, the content of which is incorporated herein by reference in its entirety.

BACKGROUND

Corporate risk models are subject to increasing standards internally and externally. The risk models are developed by a model development team in a corporation such as a financial institution. Once the models are created, they are validated by suitable teams within the corporation and are then subjected to assessment by regulators. The validation is typically time consuming as the models are validated using manual processes. The manual processes can be too subjective as they are reliant on a validator to make decisions when confirming the model's validity.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of validating models. A method of the innovation can begin by receiving a risk model for validation from a model development team, the risk model having a first set of analysis results, a first set of coefficients and standard errors, a first set of transformed selected variables, a first set of untransformed selected variables, a first set of selected transformations, and at least one data set. A first data set is selected from the at least one data set as an input.

Outputs are generated for validation. One output can be generating a second set of analysis results using a comparable algorithm to the risk model. Another output can be generating a second set of variables using a machine learning algorithm and an un-transformed set of the selected variables to assess the set of selected transformations. Another output can be generating a third set of variables using one or more machine learning algorithms and an extended feature set of variables to assess the selected variables. The outputs are compared to the analysis results, coefficients, selected variables, and selected transformations; and a report of the comparison is generated.

A system of the innovation can include a development component that receives a risk model for validation from a model development team, the risk model having a first set of analysis results, a first set of coefficients and standard errors, a first set of transformed selected variables, a first set of untransformed selected variables, a first set of selected transformations, and at least one data set. The system can include a data component that selects a first data set from the at least one data set as an input.

The system can include an output component that generates outputs. The output component can include a replication component that generates a second set of analysis results using a comparable algorithm to the risk model; a transformation benchmark component that generates a second set of variables using a machine learning algorithm and an un-transformed set of the selected variables to assess the set of selected transformations of the risk model; and a variable benchmark component that generates a third set of variables using one or more machine learning algorithms and an extended feature set of variables to assess the selected variables of the risk model. The system can include an analysis component that compares the outputs to the analysis results, coefficients, selected variables, and selected transformations; and a report component that generates a report of the comparison.

A computer readable medium of the innovation has instructions to control one or more processors configured to receive a risk model for validation from a model development team, the risk model having a first set of analysis results, a first set of coefficients and standard errors, a first set of transformed selected variables, a first set of untransformed selected variables, a first set of selected transformations, and at least one data set. The instructions can select a first data set from the at least one data set as an input. The instructions can generate outputs, comprising: a second set of analysis results using a comparable algorithm to the risk model; a second set of transformations and a second set of variables using a machine learning algorithm and an un-transformed set of the selected variables to assess the set of selected transformations of the risk model; and a third set of variables using one or more machine learning algorithms and an extended feature set of variables to assess the selected variables of the risk model. The instructions can compare the outputs to the analysis results, coefficients, selected variables, and selected transformations; and generate a report of the comparison.

In aspects, the subject innovation provides substantial benefits in terms of model validation. One advantage resides in a faster validation process aided by machine learning algorithms. Another advantage resides in avoiding development team biases and human error during validation.

To the accomplishment of the foregoing and related ends, certain illustrative aspects of the innovation are described herein m connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
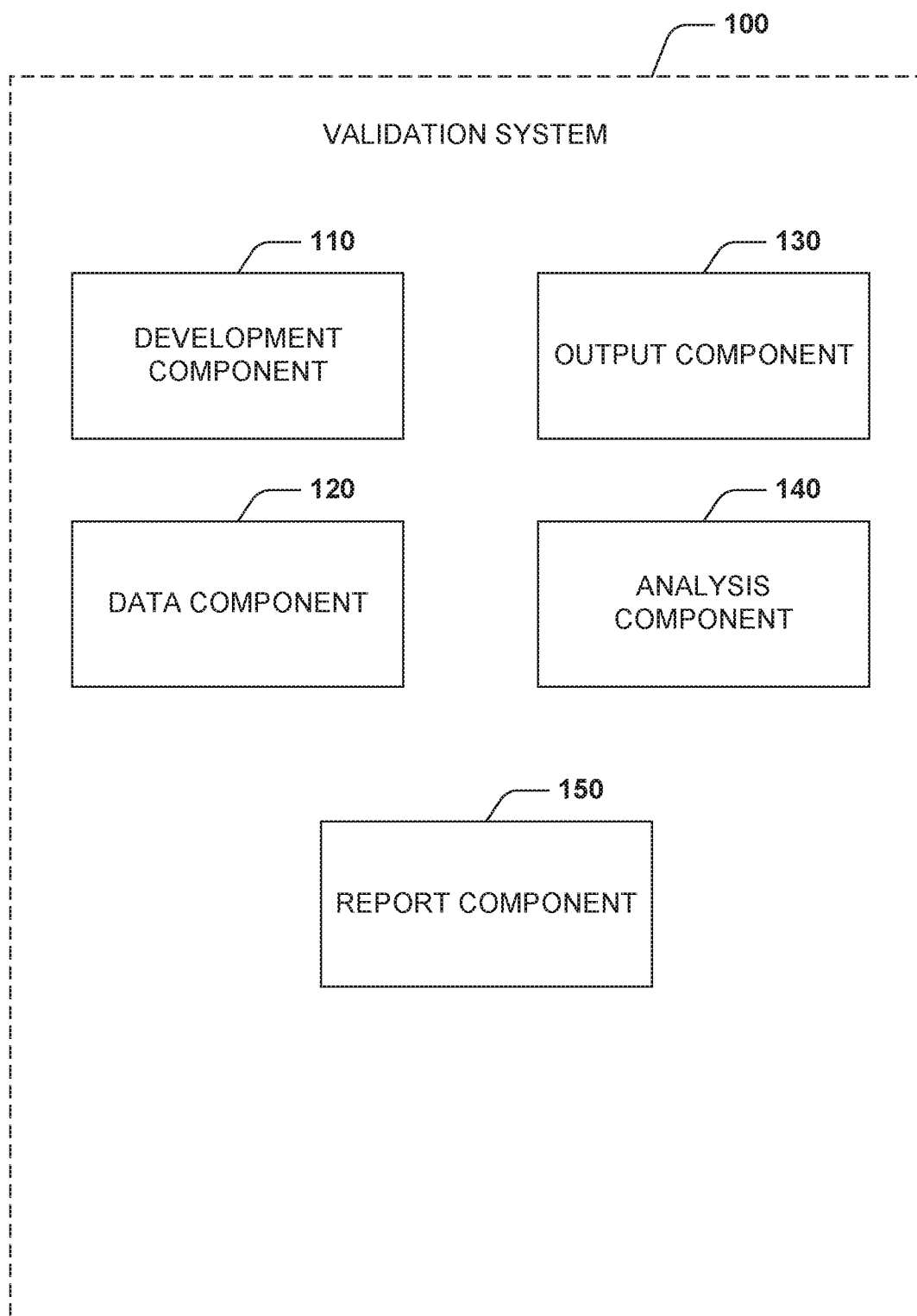
FIG. 1 illustrates an example component diagram of a validation system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates a validation system 100 for assessing and validating a developed risk model. The validation system 100 includes a development component 110 that provides access to and information about a risk model. The risk model can be a predictive model where the predictive output and risk model factors are to be validated. The risk model can be provided to the validation system 100 by a model development team (MDT) that has created the risk model and can be seeking validation of the risk model. In some embodiments, a regulator or government entity is seeking validation of the risk model.

In some embodiments, the risk model is a predictive model used for determining customer default risk for providing financial services or credit to the customer. The risk model can include a first set of analysis results, a first set of coefficients and standard errors, a first set of transformed selected variables, a first set of untransformed selected variables, a first set of selected transformations, one or more data sets, and/or the like. Such data can be provided by the MDT, the development component 120, outside sources, and/or analysis of the risk model.

The risk model can be developed using test data segments or training data sets that can be input into the model to generate results. The data segments are raw data that can be used to predict outcomes. In one example, the data segment is customer data used to evaluate the financial health and/or predictive financial performance of a customer. One data segment can be credit card data, while another data segment can be FICO scores, and/or the like.

The validation system 100 includes a data component 120 that selects a data segment to be used for validating the risk model's performance using that data segment. The data segment is associated with analysis results, set of coefficients and standard errors, set of transformed selected variables, set of untransformed selected variables, and/or selected transformations used, generated, associated, and/or developed by the risk model for that data segment.

The validation system 100 includes an output component 130 that generates outputs to assess the risk model using the same data segments and some of the risk model results and data. The output component 130 validates the risk model using three phases: replication, transformation benchmarking, and predictive performance benchmarking, each of which is discussed in detail below.

The output component 130 attempts to replicate the analysis results provided by the MDT. The output component 130 generates a second set of analysis results using a comparable algorithm to the risk model. In some embodiments, the algorithm used is a logistic regression algorithm. The second set of analysis results that include a second set of coefficients and standard errors from the algorithm.

The validation system includes an analysis component 140. The analysis component can compare the second set of analysis results to the first set of analysis results of the risk model. In some embodiments, the analysis component calculates deviation percentages between the first set of coefficients and the second set of coefficients and can flag (or highlight, or otherwise create a notification) a subset of coefficients in the first set of coefficients that deviate more than a predetermined threshold deviation from the second set of coefficients. The flags and the deviation percentages can be included in a generated report discussed in detail below.

The output component 130 can assess the transformation selections made by the MDT when they developed the risk model as part of validation. The output component 130 generates a second set of analysis that includes a second set of variables in a transformed state using a machine learning algorithm and an untransformed set of the selected variables. The output component 130 employs a machine learning algorithm to generate a second set of transformations that transform the un-transformed set of selected variables into a second set of variables.

The analysis component 140 selects a subset of the second set of transformed variables and a subset of the first set of transformed variables. The selection is based on the most dominant variables of each set and can be a predetermined number, such as the 20 most dominant variables in each set.

The analysis component 140 compares the two sets and can compute diagnostic functions between the subsets as discussed in detail below. The analysis component 140 can analyze the generated set of transformations for differences between the risk model transformations and flag the differences for a generated report.

The output component 130 can assess the predictive performance and the MDT's variable selections for the risk model. The output component 130 generates a third set (or multiple sets) of analysis results that includes a second set (or multiple sets) of selected variables using an extended feature set of variables. The output component 130 can input an extended feature set of variables, for example a 500 variable set, to determine a second set of selected variables which is a subset of the extended feature set. In some embodiments, the output component 130 utilizes multiple machine learning algorithms selecting a multiple sets of selected variables from the extended feature set. The analysis component 140 compares the second subset of selected variables and the first subset of selected variables and flags differences in variables between the subsets for a generated report.

The report component 150 generates a report of the results of the analysis component 140. The report can include flagged differences between the risk model and the outputs generated by the output component 130. In some embodiments, the analysis component 140 can calculate statistics or diagnostics between the generated outputs and the associated equivalents data sets of the MDT's risk model. For example, the analysis component 140 can generate receiver operating characteristic (ROC) curves, the area under the ROC curve (AUC), between two data sets. The analysis component 140 can compute 1-D partial importance plots with the MDT's transformations. The analysis component 140 can compute H-statistics for interactions and 2D-interactions for pairs of variables. In some embodiments, the analysis component 140 computes odds ratios, marginal effects, VIF, gain, KS, and KS charts for each data set. Each statistic can be included in the generated report by the report component 150.

Figure 2:
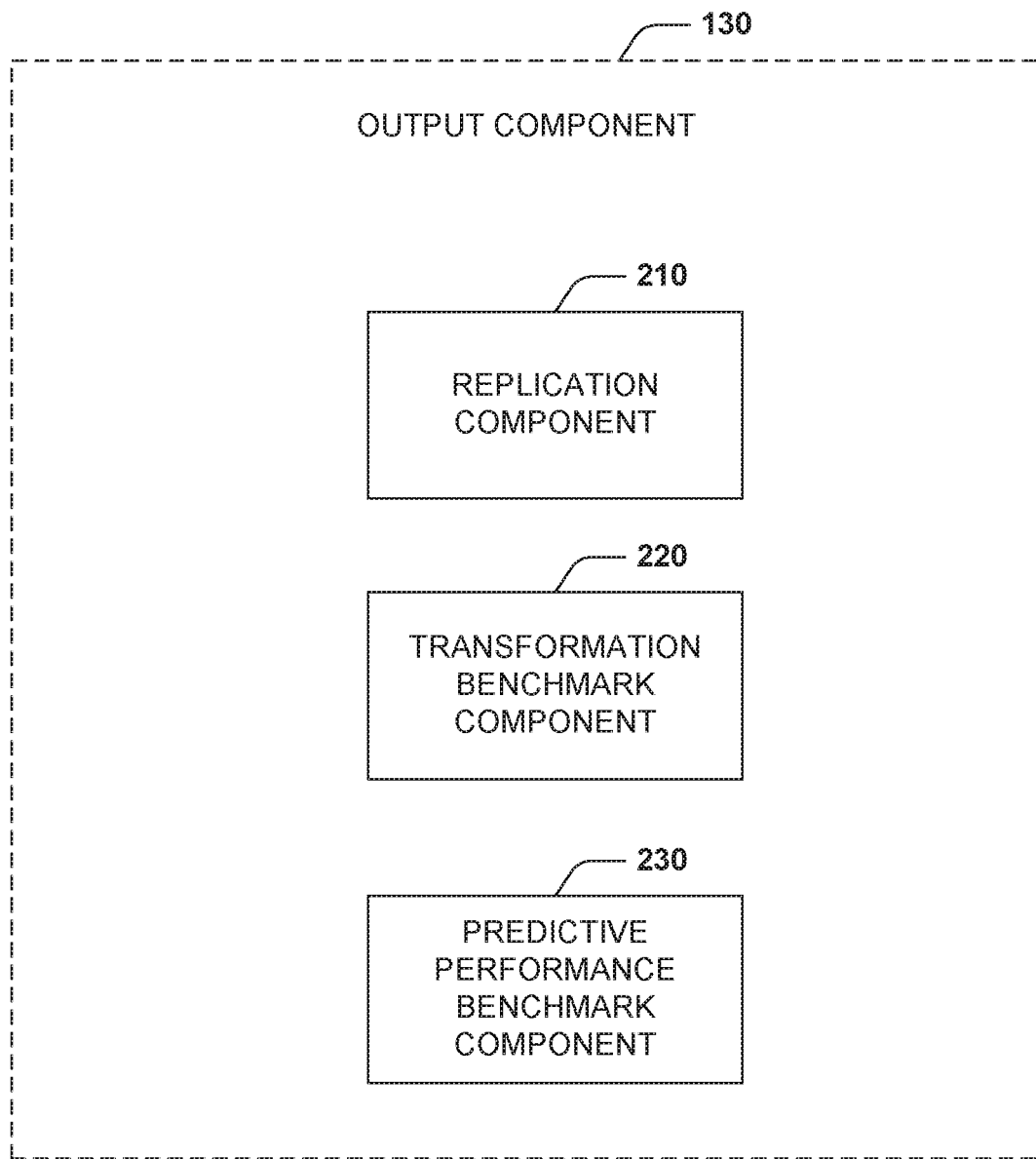
FIG. 2 illustrates an example component diagram of an output component.

FIG. 2 illustrates a detailed component diagram of the output component 130. The output component includes a replication component 210 that replicates the analysis results given by the risk model during validation. The replication component 210 replicates the analysis done by the MDT using a comparable algorithm. For example, comparable algorithms can be a logistic regression, least squares, weighted least squares, and/or the like.

The replication component 210 generates a second set of analysis results. The second set of analysis results can include regression coefficients, standard errors, and predicted probabilities. The second set of analysis results is compared with a first set of analysis results provided by the MDT using the risk model. The replication component 210 uses the comparable algorithm to avoid reproduction of possible errors in the risk model developed by MDT. The analysis component 140 provides additional diagnostics and metrics to aid validators in assessing the fit and adequacy of the risk model, described in detail below.

The output component 130 can include a transformation benchmark component 220. The transformation benchmark component 220 can assess the transformation selections made by the MDT when they developed the risk model as part of validation. The transformation benchmark component 220 assesses the predictive performance, variable selection, and feature engineering used by the MDT for the risk model. The transformation benchmark component 220 uses a machine-learning algorithm to the same set of un-transformed variables the MDT used to develop the risk model in un-transformed form The machine learning algorithm outputs a second set of transformations and a second set of transformed variables to be compared to the risk model sets developed by the MDT.

The analysis component 140 compares the predictive performance of the machine learning algorithm, based on selected metrics, with the MDT results of the risk model. In some embodiments, the analysis component 140 can compute variable importance tables, one and two-dimensional feature engineering graphs, and interaction statistics to assess the variable selections and feature transformations developed by the MDT.

The output component 130 can include a predictive performance benchmark component 230. The predictive performance benchmark component 230 assesses the predictive performance and the MDT's variable selection for the risk model. The predictive performance benchmark component 230 does broader benchmarking and assessment of the risk model by using an expanded set of independent variables from which the MDT selected its variables for the risk model. The predictive performance benchmark component 230 generates a second set of selected variables using the extended feature set of variables. The predictive performance benchmark component 230 can input an extended feature set of variables into a suite (multiple) of machine learning algorithms to determine sets of selected variables which are subsets of the extended feature set.

The multiple sets of variables are compared by the analysis component 140 to the first set of selected variables selected by the MDT for the risk model. The comparisons are based on: a) predictive performance; b) assessing whether the selected variables are among the top in the extended set of variables and identifying selected variables that are not included in the first set of selected variables; and c) identifying feature engineering (e.g. transformations) for the expanded set of variables.

Figure 3:
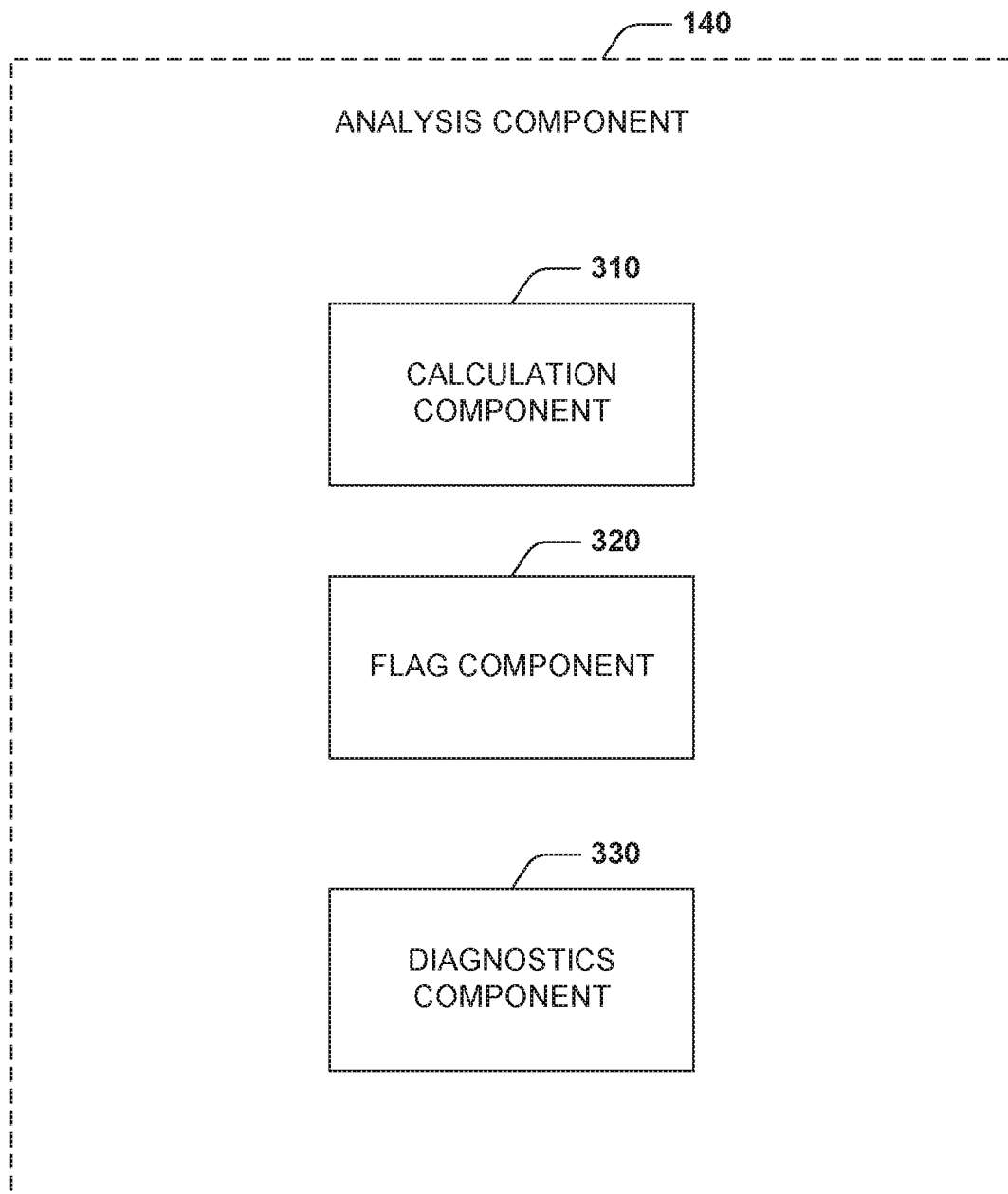
FIG. 3 illustrates an example component diagram of an analysis component.

FIG. 3 illustrates an example diagram of an analysis component 140. The analysis component can compare the outputs determined by the output component 130 to the equivalent data sets and/or outputs of the risk model developed by MDT. The analysis component 140 includes a calculation component 310 that facilitates the comparison of outputs. The calculation component can receive the output from the replication component 210. The calculation component 310 calculates deviation percentages between the first set of coefficients from the risk model and the second set of coefficients determined by the replication component 210. The calculation component 310 can calculate deviation percentages between the standard error values between a first set of standard error values of the risk model and the second set of standard error values of the replication component 210.

The analysis component 140 includes a flag component 320 that can flag (or highlight, or otherwise create a notification) a subset of coefficients in the first set of coefficients that deviate more than a predetermined threshold deviation from the second set of coefficients. The flags and the deviation percentages can be included in a generated report discussed in detail below.

The calculation component 310 can receive the output from the transformation benchmark component 220. The calculation component 310 selects a subset of the second set of transformed variables and a subset of the first set of transformed variables. The selection is based on the most dominant variables of each set and can be a predetermined number, such as the top 20 variables in each set. The flag component 320 can flag differences between the top variables in each set.

The calculation component 310 can receive the output from the variable-benchmark component 230. The flag component 320 compares the second subset of selected variables and the first subset of selected variables. The flag component 320 flags differences in variables between the subsets.

The analysis component 140 includes a diagnostics component 330. The diagnostics component 330 can determine advanced statistics, graphs, plots, diagnostic functions, and/or the like to facilitate the analysis component 140 comparing the validation outputs and the risk model data. For example, the diagnostics component 330 can determine ROC, AUC, odds ratios, marginal effects, VIF, gain, KS values, and KS charts. The analysis component 140 can pass the diagnostics, graphs, flags, and/or the like to the report component 150 to compile a report for validators and/or the MDT to review.

Figure 4:
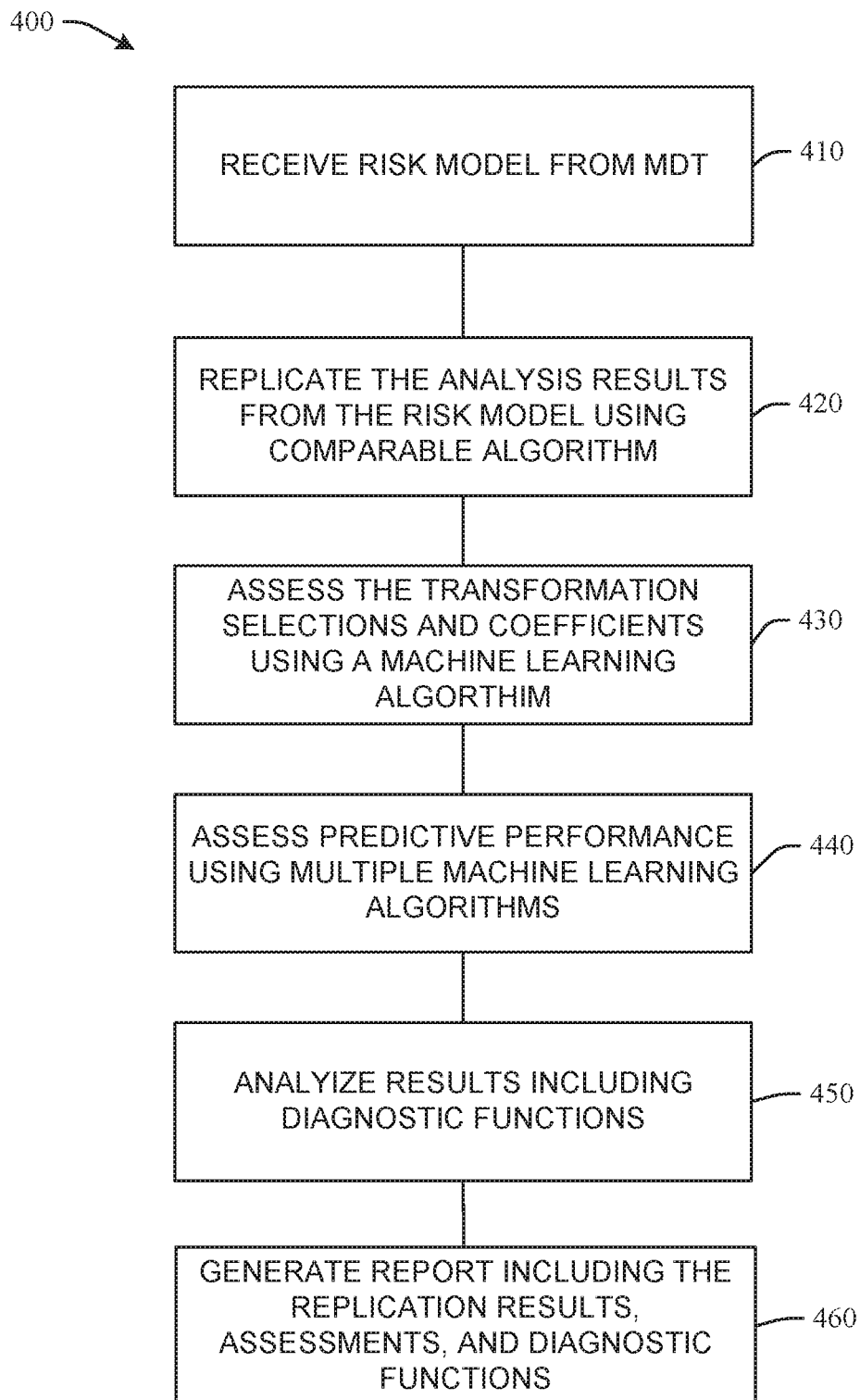
FIG. 4 illustrates a method for model validation.

With reference to FIG. 4, example method 400 is depicted for validating risk models. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram Moreover, not all illustrated acts may be required to implement a methodology in accordance with the innovation. It is also appreciated that the method 400 is described in conjunction with a specific example is for explanation purposes.

FIG. 4 illustrates a method 400 for validating risk models for financial institutions. At 410, a risk model is received for validation from a model development team The risk model includes various input data segments, and result data sets about the risk model such as analysis results, coefficients, standard errors, transformed selected variables, untransformed selected variables, selected transformations, and/or vectors. At 420, the analysis results of the risk model are replicated using a comparable algorithm. In some embodiments, the comparable algorithm is a logistic regression model that outputs a vector of predict values, a set of coefficients and standard errors.

At 430, the transformation selections and coefficients are assessed using a machine learning algorithm. The set of selected transformations is assessed using a machine learning algorithm and an un-transformed set of the selected variables to generate a second set of variables having a second set of selected transformations. The machine learning algorithm determines the second set of variables and transformations. At 440, the predictive performance and variable selection of the MDT is assessed using one or more machine learning algorithms and an extended feature set of variables to generate a third set of variables. In some embodiments, multiple machine learning algorithms each determine an individual set of selected variables from the extended feature set of variables input into each machine learning algorithm. Each machine learning algorithm returns a set of selected variables.

At 450, the outputs to the analysis results, coefficients, selected variables, and selected transformations are compared and computed diagnostics are determined to facilitate the comparison. The diagnostics can be ROC, AUC, box plots, deviations, and/or the like. At 460, a report of the comparison is generated. The report can include the diagnostics, the outputs, tables, and/or the like. The report can be presented to validators, regulators, and/or the like.

In one specific example, the replication and subsequent analysis can proceed as follows. The replication validation is done by the same data segments (e.g. groups) used by the MDT. Data segments can be type of product, by type of customers, and/or the like. The data by the MDT is also grouped into as many as three groups: in-time-training, in-time-hold-out test data, out-of-time test data. The replication model is developed on the in-time training data and its performance will be assessed on each test data set or segment.

The replication steps can be as follows: a. Identify the subset of data corresponding to in-time-training, b. Select response column and all "model-ready predictors" for that specific segment, and c. Use a comparable algorithm (such as a logistic regression) to the one used by MDT on the in time training data and save results. The results can include a vector of predicted values and regression results: estimated coefficients and standard errors.

The estimated coefficients and standard errors are compared to those of the risk model of the MDT. In some embodiments, tables are displayed juxtaposing the MDT and the replication algorithm results. The tables can include a table of coefficients from MDT and replication algorithm, differences, and tagged values that are above specified thresholds and a table of standard errors from MDT and replication algorithm, differences, and tagged values that are above specified thresholds.

The replication algorithm can compute predicted values for in-time-holdout test data and out-of-time test data and save results. For each of the test data sets—i) in-time-training set; ii) in-time-testing set; and iii) out-of-time testing set, the analysis compares vectors of predicted values from MDT and replication algorithm and displays summary metrics and relevant plots comparing the two sets of results. For each test data set—i) in-time-training set; ii) in-time-testing set; and iii) out-of-time testing set, relevant diagnostics are displayed. The above steps are repeated for the rest of the data segments.

In another specific example, the transformations assessment and subsequent analysis can proceed as follows. As above, the analysis is divided according the data segments used by the MDT. The transformation benchmarking uses the same set of variables used by the MDT but in the untransformed (original) state (e.g. before transformations, binning, and/or the like done by MDT in the risk model). A machine learning algorithm uses MDT's data segment and untransformed variables as inputs to generate transformed variables and the associated transformations. The transformation generation steps can be as follows: a. Select responses plus independent variables in untransformed state for the specific data segment, b. Train the hyper-parameters of the machine learning algorithm (e.g. a Gradient Boosting Machine) and obtain the best settings, c. Run the machine learning algorithm to get predicted responses, transformed variables, and associated transformations.

The machine learning steps are used to generate relevant response metrics for predictive performance for machine learning training data and machine learning test data. The machine learning results are displayed and compared with the equivalent results from the risk model of the MDT. In some embodiments, variable importance tables are computed for the risk model of the MDT and machine learning algorithm results and compared. For top K variables (in terms of importance), the feature transformations or binning used by the risk model are compared against 1-D partial importance plots of the results of the machine learning algorithm. The analysis can include computed H-statistics for interactions and display the table for the top M pairs of variables in the report. For the transformed variables, the analysis can compute and display 2D-partial dependence plots to assess the nature of interactions. The above is repeated for the other the data segments used by the MDT.

In yet another specific example, the variable selection assessment and subsequent analysis can proceed as follows. As above, the analysis is divided according to the data segments used by the MDT. The variable selection benchmarking uses a much bigger set of variables, i.e. the set of variables from which the MDT selected variable selection and determined the smaller subset to use in the risk model. The comparison of predictive performance of the risk model is done against multiple machine learning algorithms (e.g. 5-6 machine learning algorithms).

The analysis proceeds as follows: a. Select responses plus independent variables in original form for the data segment, b. Train the hyper-parameters of all the ML algorithms and obtain the best settings, c. Run the ML algorithms to get predicted responses.

The machine learning steps are used to generate relevant response metrics for predictive performance for machine learning training data and machine learning test data. The multiple machine learning results are displayed and compared with the equivalent results from the risk model of the MDT. In some embodiments, variable importance tables and the top K variables are computed for the risk model of the MDT and multiple machine learning algorithm results and compared. For the top K variables (in terms of importance), the feature transformations or binning used by the risk model are compared against 1-D partial importance plots of the results of the machine learning algorithm. The analysis can include computed H-statistics for interactions and display the table for the top M pairs of variables in the report. For the transformed variables, the analysis can compute and display 2D-partial dependence plots to assess the nature of interactions. The above is repeated for the other the data segments used by the MDT.

Figure 5:
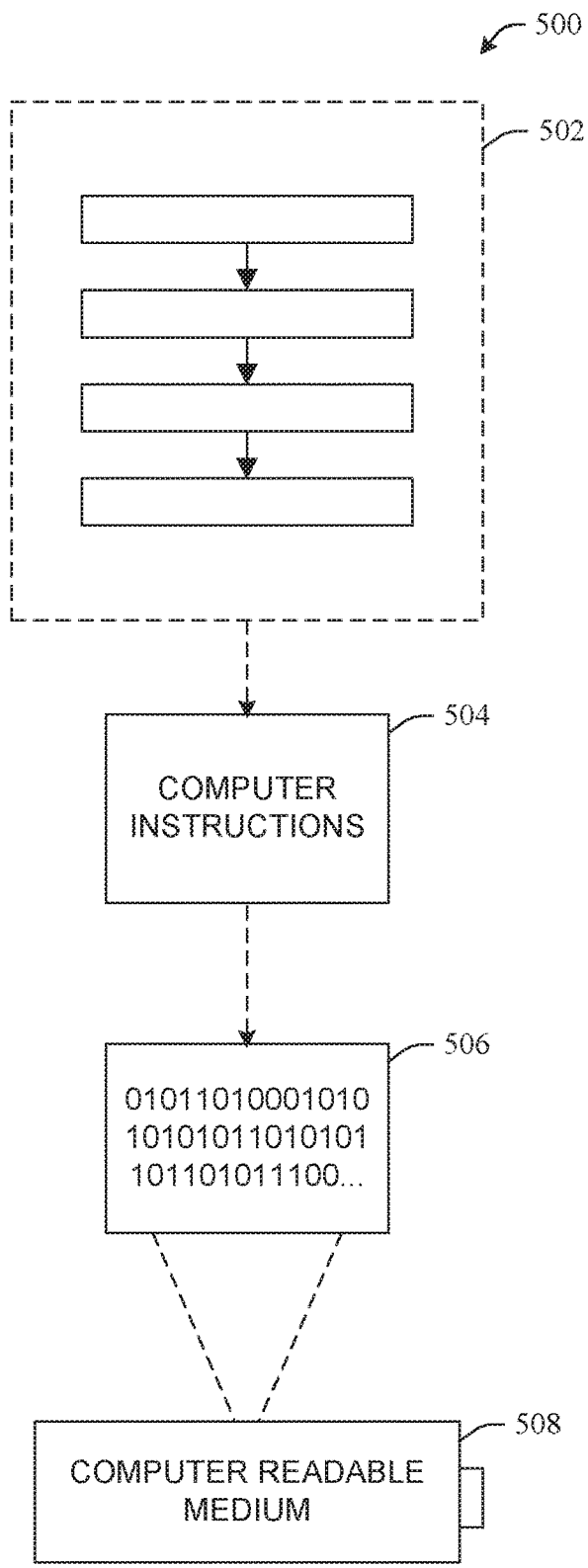
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
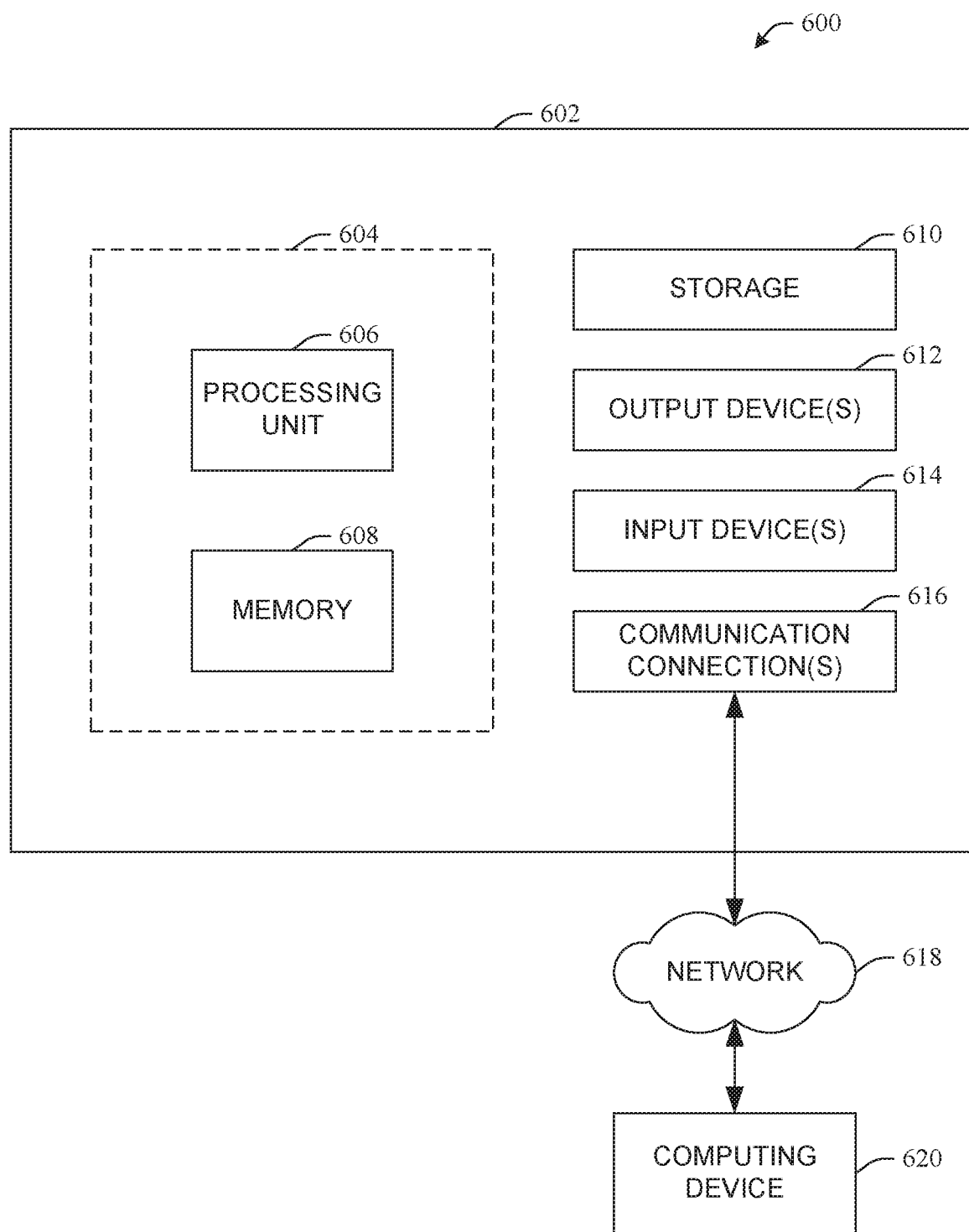
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APis), data structures, and the like, that perform particular tasks or implement particular abstract data types. Typically, the functionality of the computer readable instructions can be combined or distributed as desired in various environments.

The following description provides a hardware system for completing the complex functions and/or functionality as described above. FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim

What is claimed is:

1. A computer-implemented method, comprising:
identifying a risk model for validation, the risk model including a first data set and a plurality of result data sets corresponding to the first data set and the risk model, the plurality of result data sets including a first set of analysis results, a first set of coefficients, a first set of transformations, and a first set of variables including a first set of transformed variables and a first set of untransformed variables;
performing a replication validation of the risk model, the replication validation of the risk model including:
analyzing the first data set with a logistic regression model to produce a second set of analysis results including a second set of coefficients, and
comparing at least one portion of the first set of analysis results to at least one portion of the second set of analysis results;
performing a transformation benchmarking validation of the risk model, the transformation benchmarking validation of the risk model including:
inputting the first set of untransformed variables and the first data set into a first machine learning algorithm to produce a second set of transformations and a second set of transformed variables, and
comparing at least one portion of the first set of transformed variables to at least one portion of the second set of transformed variables;
performing a predictive performance benchmarking of the risk model, the predictive performance benchmarking of the risk model including:
identifying an extended feature set of variables;
selecting a second set of variables from the extended feature set of variables with a second machine learning algorithm, and
comparing at least one portion of the first set of variables to at least one portion of the second set of variables; and
generating a digital report based on comparison of the at least one portion of the first set of analysis results to the at least one portion of the second set of analysis results, comparison of the at least one portion of the first set of transformed variables to the at least one portion of the second set of transformed variables, and comparison of the at least one portion of the first set of variables to the at least one portion of the second set of variables.

2. The computer-implemented method of claim 1, wherein the first set of variables was selected from a first feature set of variables having fewer variables than the extended feature set of variables.

3. The computer-implemented method of claim 1, wherein comparing the at least one portion of the first set of analysis results to the at least one portion of the second set of analysis results includes:
calculating deviation percentages between the first set of coefficients and the second set of coefficients; and
flagging a subset of coefficients in the first set of coefficients that deviate more than a predetermined threshold deviation from the second set of coefficients.

4. The computer-implemented method of claim 1, wherein comparing the at least one portion of the first set of transformed variables to the at least one portion of the second set of transformed variables include:
selecting a subset of the second set of transformed variables and a subset of the first set of transformed variables, wherein each subset is a selection of most dominant variables of each set; and
computing diagnostic functions between the subsets.

5. The computer-implemented method of claim 1, wherein the logistic regression model is comparable to the risk model.

6. The computer-implemented method of claim 1, wherein the risk model comprises a predictive model used for determining risk associated with providing services or credit to a customer.

7. The computer-implemented method of claim 1, wherein the digital report includes at least one receiver operating characteristic (ROC) curve or an area under an ROC.

8. A non-transitory computer readable medium for validating a model, the non-transitory computer readable medium having instructions to control one or more processors configured to:
identify a risk model for validation, the risk model including a first data set and a plurality of result data sets corresponding to the first data set and the risk model, the plurality of result data sets including a first set of analysis results, a first set of coefficients, a first set of transformations, and a first set of variables including a first set of transformed variables and a first set of untransformed variables;

perform a replication validation of the risk model, the replication validation of the risk model including:
analyzing the first data set with a logistic regression model to produce a second set of analysis results including a second set of coefficients, and
comparing at least one portion of the first set of analysis results to at least one portion of the second set of analysis results;

perform a transformation benchmarking validation of the risk model, the transformation benchmarking validation of the risk model including:
inputting the first set of untransformed variables and the first data set into a first machine learning algorithm to produce a second set of transformations and a second set of transformed variables, and
comparing at least one portion of the first set of transformed variables to at least one portion of the second set of transformed variables;

perform a predictive performance benchmarking of the risk model, the predictive performance benchmarking of the risk model including:
identifying an extended feature set of variables;
selecting a second set of variables from the extended feature set of variables with a second machine learning algorithm, and
comparing at least one portion of the first set of variables to at least one portion of the second set of variables; and generate a digital report based on comparison of the at least one portion of the first set of analysis results to the at least one portion of the second set of analysis results, comparison of the at least one portion of the first set of transformed variables to the at least one portion of the second set of transformed variables, and comparison of the at least one portion of the first set of variables to the at least one portion of the second set of variables.

9. The non-transitory computer readable medium of claim 8, wherein the first set of variables was selected from a first feature set of variables having fewer variables than the extended feature set of variables.

10. The non-transitory computer readable medium of claim 8, wherein comparing the at least one portion of the first set of analysis results to the at least one portion of the second set of analysis results includes:
calculating deviation percentages between the first set of coefficients and the second set of coefficients; and
flagging a subset of coefficients in the first set of coefficients that deviate more than a predetermined threshold deviation from the second set of coefficients.

11. The non-transitory computer readable medium of claim 8, wherein comparing the at least one portion of the first set of transformed variables to the at least one portion of the second set of transformed variables include:
selecting a subset of the second set of transformed variables and a subset of the first set of transformed variables, wherein each subset is a selection of most dominant variables of each set; and
computing diagnostic functions between the subsets.

12. The non-transitory computer readable medium of claim 8, wherein the logistic regression model is comparable to the risk model.

13. The non-transitory computer readable medium of claim 8, wherein the risk model comprises a predictive model used for determining risk associated with providing services or credit to a customer.

14. The non-transitory computer readable medium of claim 8, wherein the digital report includes at least one receiver operating characteristic (ROC) curve or an area under an ROC.

15. A system for validating a model, comprising:
one or more hardware processors;
a development component using at least one of the one or more hardware processors to identify a risk model for validation, the risk model including a first data set and a plurality of result data sets corresponding to the first data set and the risk model, the plurality of result data sets including a first set of analysis results, a first set of coefficients, a first set of transformations, and a first set of variables including a first set of transformed variables and a first set of untransformed variables;
a replication component using at least one of the one or more hardware processors to perform a replication validation of the risk model, the replication validation of the risk model to:
analyze the first data set with a logistic regression model to produce a second set of analysis results including a second set of coefficients, and
compare at least one portion of the first set of analysis results to at least one portion of the second set of analysis results;
a transformation benchmark component using at least one of the one or more hardware processors to perform a transformation benchmarking validation of the risk model, the transformation benchmarking validation of the risk model to:
input the first set of untransformed variables and the first data set into a first machine learning algorithm to produce a second set of transformations and a second set of transformed variables, and
compare at least one portion of the first set of transformed variables to at least one portion of the second set of transformed variables;
a predictive performance benchmark component using at least one of the one or more hardware processors to perform a predictive performance benchmarking of the risk model, the predictive performance benchmarking of the risk model to:
identify an extended feature set of variables;
select a second set of variables from the extended feature set of variables with a second machine learning algorithm, and
compare at least one portion of the first set of variables to at least one portion of the second set of variables; and
a report component using at least one of the one or more hardware processors to generate a digital report based on comparison of the at least one portion of the first set of analysis results to the at least one portion of the second set of analysis results, comparison of the at least one portion of the first set of transformed variables to the at least one portion of the second set of transformed variables, and comparison of the at least one portion of the first set of variables to the at least one portion of the second set of variables.

16. The system of claim 15, wherein the first set of variables was selected from a first feature set of variables having fewer variables than the extended feature set of variables.

17. The system of claim 15, wherein comparing the at least one portion of the first set of analysis results to the at least one portion of the second set of analysis results includes:
- calculating deviation percentages between the first set of coefficients and the second set of coefficients; and
- flagging a subset of coefficients in the first set of coefficients that deviate more than a predetermined threshold deviation from the second set of coefficients.

18. The system of claim 15, wherein comparing the at least one portion of the first set of transformed variables to the at least one portion of the second set of transformed variables include:
- selecting a subset of the second set of transformed variables and a subset of the first set of transformed variables, wherein each subset is a selection of most dominant variables of each set; and
- computing diagnostic functions between the subsets.

19. The system of claim 15, wherein the risk model comprises a predictive model used for determining risk associated with providing services or credit to a customer.

20. The system of claim 15, wherein the digital report includes at least one receiver operating characteristic (ROC) curve or an area under an ROC.

\* \* \* \* \*